Dec. 31, 1929.  E. HEYMANN  1,741,365
BRAKE MECHANISM
Filed June 11, 1927
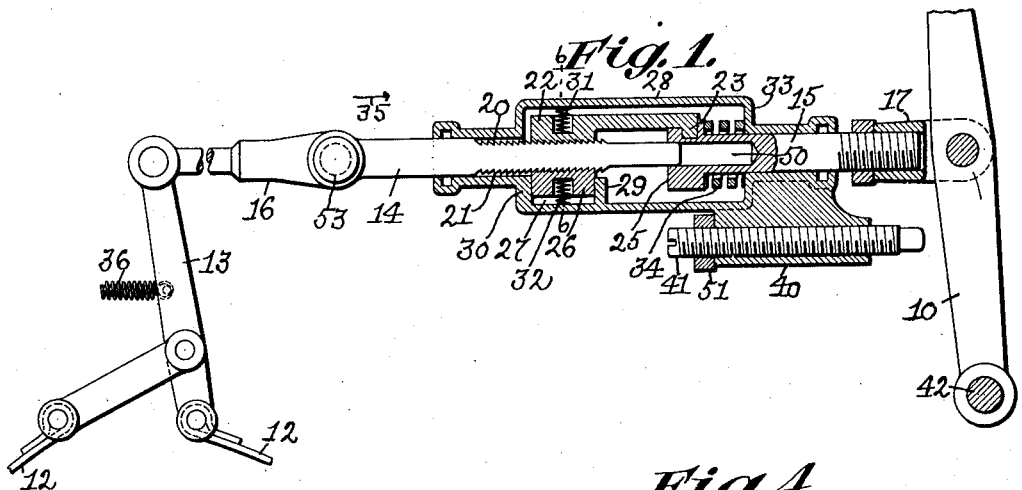
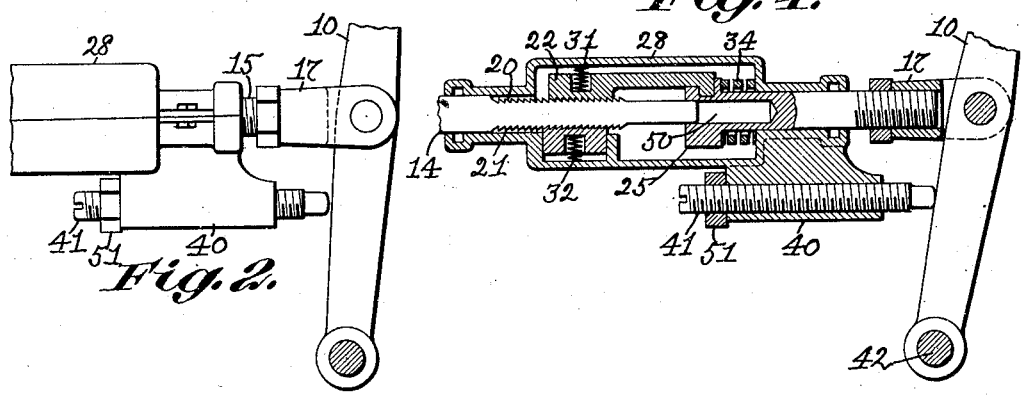
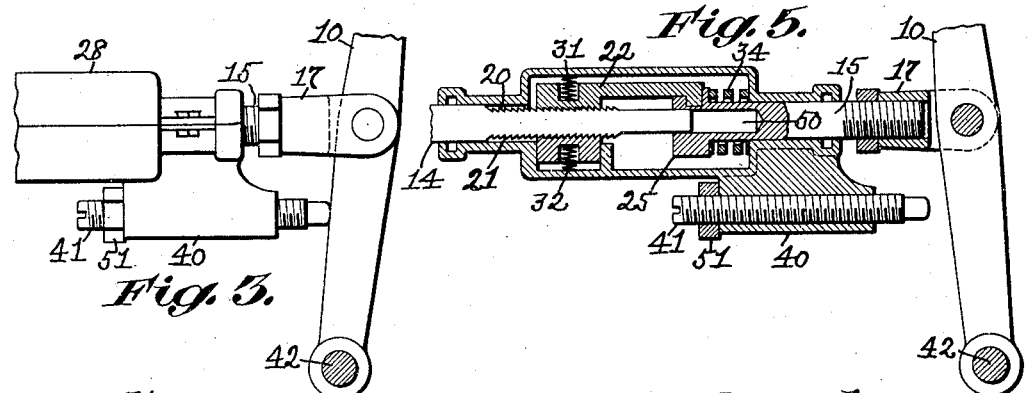
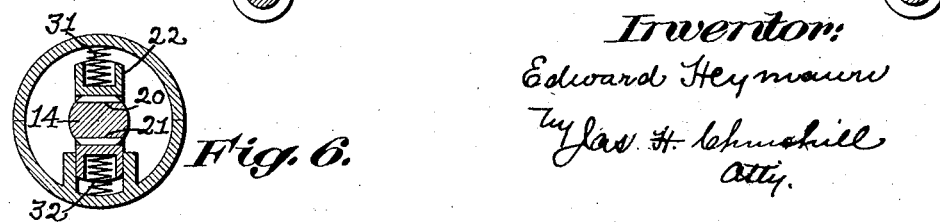
Inventor:
Edward Heymann
By Jas. H. Churchill
Atty.

Patented Dec. 31, 1929

1,741,365

UNITED STATES PATENT OFFICE

EDWARD HEYMANN, OF BOSTON, MASSACHUSETTS

BRAKE MECHANISM

Application filed June 11, 1927. Serial No. 198,089.

This invention relates to a brake mechanism and has for its object to provide a brake mechanism having provision for automatically compensating for the wear of the brake-shoe.

The invention is particularly useful in a brake mechanism for automobiles and like motor vehicles.

The invention further has for its object to provide a brake mechanism which permits of the brake mechanisms now used on motor vehicles and the like to be converted into the improved brake mechanism in minimum time and at a minimum cost.

The particular features of the invention will be pointed out in the claims at the end of this specification.

Fig. 1 represents in section and elevation a brake mechanism embodying the invention, with the parts in the position they occupy when the brake is released and the brake-shoe not worn;

Fig. 2, a detail in elevation showing the brake operating lever and the abutment member in the positions they would occupy with the brake unworn and applied;

Fig. 3, a detail like Fig. 2, showing the abutment member engaged with the brake lever when the brake is worn;

Fig. 4, a longitudinal section through the abutment member with the latter in its stationary position shown in Fig. 3, and showing the take-up spring compressed;

Fig. 5, a section like Fig. 4, showing the brake-operating lever released and the slack taken up, and Fig. 6, a section on the line 6—6, Fig. 1.

In the present instance, the invention is shown in a mechanical brake mechanism of that character commonly employed on automobiles, and comprising a brake-operating lever 10, a brake band 12, a lever 13 to which the brake band or shoe 12 is connected, and a connecting mechanism between the levers 10, 12, which in the brake mechanisms now in common use is a connecting rod.

In accordance with this invention, the intermediate connection, which, for convenience, may be termed a connecting rod, is composed of two members 14, 15, one of which is capable of being moved with relation to the other. The member 14 is connected through a link 16 with the lever 13, and the member 15 is connected with the lever 10 by a socket member 17 pivoted to the lever 10 and with which the member 15 is in threaded engagement for purpose of initially adjusting the length of the connecting rod.

The member 14 is provided on opposite surfaces with ratchet teeth 20, 21, which may be termed upper and lower sets of ratchet teeth. The upper set of ratchet teeth 20 has co-operating with it a pull pawl 22 connected with the member 15 of the connecting rod.

This connection may be effected as shown by a lug 23 on the pull pawl entering a recess in a head 25 on the member 15.

The lower set 21 of ratchet teeth has co-operating with it a holding pawl 26 located in a chamber 27 in a casing or housing 28, said chamber being formed by a wall 29 within the casing and a head 30 thereof.

The pawls 22, 26, are kept engaged with the upper and lower sets of ratchet teeth by springs 31, 32. Between the head 25 on the member 15 and the head 33 of the casing or housing 28 is located a relatively strong spring 34 which encircles the member 15 and which will be hereinafter designated the take-up spring. The casing or housing 28 is mounted loosely on the members 14, 15 of the connecting rod, and when the brake band 12, which will be hereinafter referred to as the brake-shoe, is new and unworn, the casing 28 moves with the members 14, 15 of the connecting rod, which members move as one piece in opposite directions, being moved forward in the direction of the arrow 35 by pressure applied to the lever 10. which may be termed the brake-operating lever, and which may be operated by foot or by hand.

Under the conditions described, which may be termed the normal conditions, the connecting rod and casing are moved in the return or opposite direction by the usual spring employed to release the brake-shoe and which is represented by the spring 36 connected with the lever 13. As long as the brake-shoe remains in its normal or unworn condition, the brake mechanism functions like the brake mechanisms now commonly employed, the members 14, 15 and the casing 28 moving as a unit.

When, however, the brake-shoe becomes worn any material amount, provision is made for automatically taking up the slack so as to compensate for wear of the brake-shoe.

In the present instance, one construction is provided for this purpose, and provision is made for rendering the casing or housing stationary after it has been moved a certain distance with the connecting rod 14, 15.

To this end the casing 28 has attached to it a projection or member 40 provided with a threaded bore through which is extended a threaded rod 41, which is designed to be engaged with the brake-operating lever 10 near the pivot 42 thereof, on the initial forward movement of the connecting rod 14, 15 and casing 28.

On the further forward movement of the brake-operating lever, the connecting rod 14, 15 is moved forward independently of the casing 28, which is now practically stationary and constitutes an abutment for the take-up spring 34, which is compressed by the head 25 on the member 15 as the latter and the member 14 are moved further forward to apply the brake-shoe 12 the ratchet teeth 21 slipping over the pawl 26.

This compressed condition of the spring 34 is represented in Fig. 4, and by reference thereto, it will be seen that the pull pawl 22 has been moved away from the head 30 of the casing 28 substantially the distance of one tooth of the upper set of ratchet teeth, from the position shown in Fig. 1.

The distance the pull pawl 22 has been moved away from the head 30 of the casing, represents the amount the brake-shoe has been worn. When the take-up spring 34 has been compressed as shown in Fig. 4, and the brake-shoe 12 has been applied to its co-operating member, not shown, the brake-operating lever 10 is then released, and is moved back to its starting position by the conjoint action of the take-up spring 34 and the release spring 36, and on this return movement, the take-up spring acts to move the member 15 with relation to the member 14, and thus move the pull pawl 22 backward the distance of one tooth of the upper set 20 of ratchet teeth into the position shown in Fig. 5, which is its normal or starting position, the same as represented in Fig. 1.

On this return movement of the member 15, the member 14 is held stationary by the holding pawl 26, and the member 15 is moved with relation to the member 14, whose front end is entered into a socket 50 in the member 15.

By reference to Fig. 5, it will be observed that the member 15 has been moved back over the front end of the member 14 and the latter has advanced into the socket 50 a distance substantially equal to the distance of a tooth of the upper set 20 of ratchet teeth, as becomes evident by comparing Fig. 5 with Figs. 1 and 4.

The distance the member 15 is moved over the member 14 by the take-up spring 34 represents the wear of the brake-shoe, and when this wear has been taken up, as above described, the members 14, 15 again function as a one-piece connecting rod, until the brake-shoe has been again worn sufficiently to enable the take-up spring to again take up the slack in the connection between the brake-shoe 12 and the brake-operating lever 10. The holding pawl 26 prevents the member 14 being moved backward by the friction between the pull pawl and the upper set of ratchet teeth as said pull pawl is moved backward by the take-up spring.

The threaded rod 41 may be adjusted with relation to the lever 10 and may be locked in its adjusted position by a nut 51 thereon engaging the supporting member 40.

By means of the threaded rod 41, the amount the brake-shoe is worn before the take-up spring 34 functions, may be regulated or determined.

It will be observed that the member 15 is detachably connected with the socket member 17 and that the member 14 is detachably connected with the link 16 by the pin 53, which connections are employed in the usual mechanical brake mechanisms on automobiles, and therefore the automatic take-up mechanism hereinshown, may be substituted for the ordinary connecting rod of the mechanical brake mechanism now in common use, at a minimum expense and in a minimum time.

It will be observed that when the brake-shoe is not worn or in its normal condition, the casing 28 moves with the connecting rod 14, 15 and does not function as an abutment member for the take-up spring 34, until the brake-shoe has been worn sufficiently to permit the screw rod 41 to engage the lever 10 and convert the movable casing 28 into a stationary casing and thus cause it to function as an abutment member for the take-up spring.

One embodiment of the invention is herein shown, but it is not desired to limit the invention to the particular construction shown.

What is claimed is:

1. In a brake mechanism, in combination, a brake-shoe, a lever for applying the brake-shoe, a connecting rod composed of members, one of which is capable of being moved with relation to the other, and one of which is provided with ratchet teeth, a pull pawl co-operating with said ratchet teeth and connected with the other member of the connecting rod, an abutment member, a take-up spring interposed between the pull pawl and said abutment member and co-operating with both to be compressed by the pull pawl when the brake-shoe in a worn condition is applied, and to move the pull pawl with relation to the ratchet teeth and take up the slack in the connecting rod when the brake-operating lever is released, and a holding pawl co-operating with the ratchet teeth to hold the latter from moving with the pull pawl on the reverse movement of the latter.

2. In a brake mechanism, in combination, a brake-shoe, a device for operating the same and an automatic take-up unit between said brake-shoe and said device, said unit comprising a casing, connecting rod members extended into said casing, a pull pawl connected with one of said members to move therewith and co-operating with ratchet teeth on the other of said members to move the latter member, a take-up spring within said casing and normally inactive to move said pull pawl with relation to its co-operating ratchet teeth, and rendered active to move said pull pawl with relation to said ratchet teeth when the brake-shoe has been worn a predetermined amount.

In testimony whereof, I have signed my name to this specification.

EDWARD HEYMANN.